US012683409B2

(12) United States Patent
Hosokawa

(10) Patent No.: US 12,683,409 B2
(45) Date of Patent: Jul. 14, 2026

(54) POWER SUPPLY SYSTEM

(71) Applicant: TOYOTA JIDOSHA KABUSHIKI KAISHA, Toyota (JP)

(72) Inventor: Yohei Hosokawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/195,881

(22) Filed: May 1, 2025

(65) Prior Publication Data

US 2026/0112899 A1 Apr. 23, 2026

(30) Foreign Application Priority Data

Sep. 20, 2024 (JP) ................................. 2024-164004

(51) Int. Cl.
| | |
|---|---|
| *B60L 1/00* | (2006.01) |
| *B60L 7/10* | (2006.01) |
| *B60L 11/18* | (2006.01) |
| *B60L 58/12* | (2019.01) |
| *B60L 58/19* | (2019.01) |
| *B60L 58/22* | (2019.01) |
| *H01M 10/42* | (2006.01) |
| *H01M 50/51* | (2021.01) |
| *H01M 50/512* | (2021.01) |

(Continued)

(52) U.S. Cl.
CPC ............ *H02J 7/1423* (2013.01); *B60L 58/12* (2019.02); *B60L 58/19* (2019.02); *B60L 58/22* (2019.02); *H01M 10/425* (2013.01); *H01M 50/51* (2021.01); *H01M 50/512* (2021.01); *H02J 7/24* (2013.01); *H01M 2010/4271* (2013.01); *H01M 2220/20* (2013.01); *H02J 2207/20* (2020.01)

(58) Field of Classification Search
CPC ........ H02J 7/1423; H02J 7/24; H02J 2207/20; B60L 58/12; B60L 58/19; B60L 58/22; B60L 1/00; B60L 11/18; B60L 7/10; H01M 10/425; H01M 50/51; H01M 50/512; H01M 2010/4271; H01M 2220/20; H02P 3/14
USPC ....................................................... 307/10.1
See application file for complete search history.

(56) References Cited

U.S. PATENT DOCUMENTS

2020/0070667 A1* 3/2020 Wang ..................... B60L 58/19

FOREIGN PATENT DOCUMENTS

JP 2013-081316 A 5/2013

* cited by examiner

*Primary Examiner* — Rexford N Barnie
*Assistant Examiner* — Xuan Ly
(74) *Attorney, Agent, or Firm* — SoraIP, Inc.

(57) ABSTRACT

A power supply system includes: a first battery; a second battery having the same configuration as the first battery; auxiliary equipment connected to a low-voltage power line connected to an auxiliary battery; a series-parallel switching circuit configured to switching connection of the first and second batteries between series connection and parallel connection by turning on and off a plurality of relays; and a power converter connected to the series-parallel switching circuit and the low-voltage power line. When the first battery and the second battery are to be charged with power from a power generator, the first and second batteries are connected in series and charged when power consumption of the auxiliary equipment is equal to or greater than predetermined power, and the first and second batteries are not connected in series and are charged when the power consumption of the auxiliary equipment is less than the predetermined power.

4 Claims, 5 Drawing Sheets

(51) Int. Cl.
  *H02J 7/14*       (2006.01)
  *H02J 7/24*       (2006.01)
  *H02P 3/14*       (2006.01)

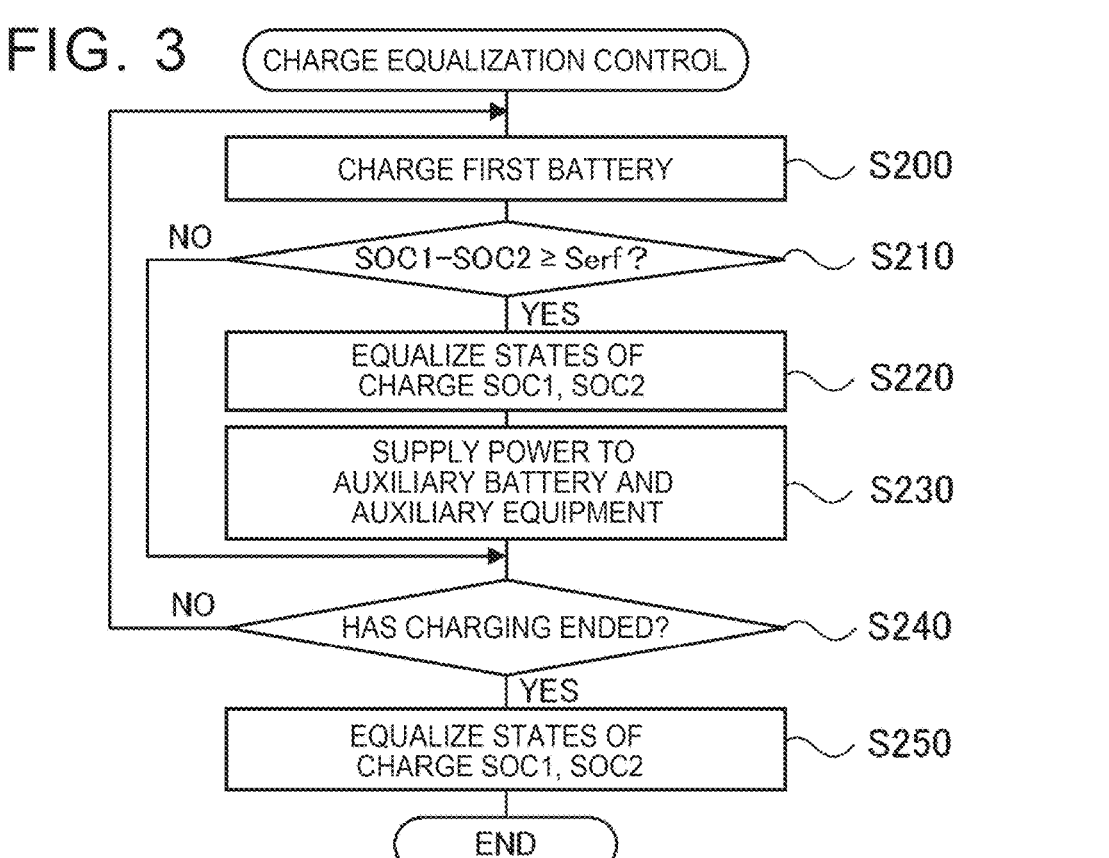

FIG. 2

SOLAR CHARGING PROCESS

SOLAR CHARGING? — S100

NO

YES

S110 — LESS THAN PREDETERMINED AUXILIARY LOAD POWER?

NO

YES

S120 — CALCULATE LOSS L1 FOR SERIES CONNECTION CHARGE CONTROL AND LOSS L2 FOR CHARGE EQUALIZATION CONTROL

S130 — L1 ≥ L2 ?

NO

S140

YES

S150 — CHARGE EQUALIZATION CONTROL

SERIES CONNECTION CHARGE CONTROL

END

FIG. 3

CHARGE EQUALIZATION CONTROL

CHARGE FIRST BATTERY — S200

SOC1−SOC2 ≥ Serf ? — S210

NO

YES

EQUALIZE STATES OF CHARGE SOC1, SOC2 — S220

SUPPLY POWER TO AUXILIARY BATTERY AND AUXILIARY EQUIPMENT — S230

HAS CHARGING ENDED? — S240

NO

YES

EQUALIZE STATES OF CHARGE SOC1, SOC2 — S250

END

POWER SUPPLY SYSTEM

CROSS-REFERENCE TO RELATED APPLICATION

This application claims priority to Japanese Patent Application No. 2024-164004 filed on Sep. 20, 2024. The disclosure of the above-identified application, including the specification, drawings, and claims, is incorporated by reference herein in its entirety.

BACKGROUND

1. Technical Field

The present disclosure relates to power supply systems, and more particularly to an in-vehicle power supply system including two batteries that can be connected either in series or in parallel for charging or discharging.

2. Description of Related Art

A series-parallel battery system that can switch connection of a plurality of batteries between series connection and parallel connection has been proposed as this type of power supply system (see, for example, Japanese Unexamined Patent Application Publication No. 2013-081316 (JP 2013-081316 A)). In this system, the connection mode at the start of charging is selected based on the temperature and state of charge (SOC) of a power supply device, and a charging current for the parallel connection mode is controlled using an upper limit value that is larger than an upper limit value of a charging current for the series connection mode that is applied to the power supply device.

SUMMARY

When charging two batteries with power from a solar panel mounted on a vehicle, a situation may frequently occur in which power requested to drive auxiliary equipment is greater than power generated by the solar panel, depending on the driving state of the auxiliary equipment or the weather. When the power requested to drive the auxiliary equipment is greater than the power generated by the solar panel, the power from the two batteries is stepped down in voltage by a direct current-to-direct current (DC/DC) converter and supplied to the auxiliary equipment. Since it is desired to simplify the configuration of the DC/DC converter, the specifications are often such that, with the two batteries connected in series, the power from the two batteries is stepped down in voltage and supplied to the auxiliary equipment. In this case, during charging of the two batteries connected in parallel or one of these batteries with the power generated by the solar panel, the power requested to drive the auxiliary equipment may become greater than the power generated by the solar panel. When this happens, connection of the two batteries is desired to be switched to series connection in order to step down the voltage of the power from the two batteries using the DC/DC converter and supply the resultant power to the auxiliary equipment. When the power requested to drive the auxiliary equipment frequently becomes greater than the power generated by the solar panel, connection of the two batteries is frequently switched between parallel connection and series connection.

A power supply system of the present disclosure can reduce frequent switching between series connection and non-series connection of two batteries that can be connected in series and non-series, when charging the two batteries with power from an in-vehicle power generator.

The power supply system of the present disclosure adopts the following measures.

The power supply system of the present disclosure is configured to be mounted on a vehicle. The power supply system includes:

a first battery;

a second battery having the same configuration as the first battery;

an auxiliary battery having a voltage lower than a rated voltage of the first battery;

auxiliary equipment connected to a low-voltage power line connected to the auxiliary battery;

an in-vehicle power generator connected to the low-voltage power line;

a series-parallel switching circuit including a plurality of relays and configured to switch connection of the first battery and the second battery between series connection and parallel connection by turning on and off the relays;

a power converter connected to the series-parallel switching circuit and the low-voltage power line; and a controller configured to drive and control the relays of the series-parallel switching circuit and to control the power converter.

The controller is configured to, when the first battery and the second battery are to be charged with power from the power generator, perform series connection charge control when power consumption of the auxiliary equipment is equal to or greater than predetermined power, and perform non-series connection charge control when the power consumption of the auxiliary equipment is less than the predetermined power.

The series connection charge control is control in which the controller controls the relays and the power converter such that the first battery and the second battery are connected in series and are charged with the power from the power generator. The non-series connection charge control is control in which the controller controls the relays and the power converter such that the first battery and the second battery are not connected in series and are charged with the power from the power generator.

The power supply system of the present disclosure is mounted on a vehicle, and includes: the first battery; the second battery having the same configuration as the first battery; the auxiliary battery having a voltage lower than the rated voltage of the first battery; the auxiliary equipment connected to the low-voltage power line connected to the auxiliary battery; and the in-vehicle power generator connected to the low-voltage power line. The power supply system of the present disclosure further includes: the series-parallel switching circuit including the relays and configured to switch connection of the first battery and the second battery between series connection and parallel connection by turning on and off the relays; the power converter connected to the series-parallel switching circuit and the low-voltage power line; and the controller configured to drive and control the relays of the series-parallel switching circuit and to control the power converter. When the first battery and the second battery are to be charged with power from the power generator, the controller performs the series connection charge control when power consumption of the auxiliary equipment is equal to or greater than the predetermined power. The series connection charge control is control in which the controller controls the relays and the power converter such that the first battery and the second battery are connected in series and are charged with the power from the power generator. On the other hand, the controller performs the non-series connection charge control when the power consumption of the auxiliary equipment is less than the predetermined power. The non-series connection charge control is control in which the controller controls the relays and the power converter such that the first battery and the second battery are not connected in series and are charged with the power from the power generator. Setting the predetermined power to relatively low power generated by the power generator can reduce frequent switching of the first and second batteries from non-series connection to series-connection due to the power consumption of the auxiliary equipment frequently becoming greater than the power generated by the power generator.

In the power supply system of the present disclosure, the controller may be configured to perform, as the non-series connection charge control, control of alternately performing a first battery charging process and a state-of-charge equalization process. The first battery charging process is a process of charging the first battery by turning on and off the relays such that the first battery is charged with the power from the power generator. The state-of-charge equalization process is a process of equalizing the state of charge of the first battery and the state of charge of the second battery by charging the second battery with power from the first battery by turning on and off the relays such that the second battery is charged with the power from the first battery. Equalization of the state of charge of the first battery and the state of charge of the second battery is performed in a relatively short time. Therefore, the first battery and the second battery can be charged in the time period during which the first battery is charged with the power from the power generator and the short time period during which the equalization is performed. Charging efficiency can thus be improved. In this case, the controller may be configured to supply the power from the power generator to the auxiliary equipment or the auxiliary battery during the state-of-charge equalization process. The power from the power generator can thus be effectively used even during the state-of-charge equalization process.

In the power supply system of the present disclosure, the series-parallel switching circuit may further include: a series connection line configured to connect an anode terminal of the first battery and a cathode terminal of the second battery; a series connection relay provided on the series connection line; a cathode bus connected to a cathode terminal of the first battery; an anode bus connected to an anode terminal of the second battery; an inverter connected to the cathode bus and the anode bus; a three-phase alternating current motor configured to be driven by the inverter; a cathode relay provided on the cathode bus; an anode relay provided on the anode bus; a first parallel connection line configured to connect the series connection line at a position closer to the first battery than the series connection relay and the anode bus; a first parallel connection relay provided on the first parallel connection line; a second parallel connection line configured to connect the cathode terminal of the second battery and a neutral point of the three-phase alternating current motor; and a second parallel connection relay and a third parallel connection relay that are provided on the second parallel connection line in the order of the second parallel connection relay and the third parallel connection relay from the second battery.

The power converter may be connected via a charging relay to the cathode bus at a position closer to the first battery than the cathode relay and to the anode bus at a position closer to the second battery than the anode relay.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an example of a solar charging process performed by the electronic control unit 60;

FIG. 3 is a flowchart illustrating an example of charge equalization control performed by the electronic control unit 60;

DETAILED DESCRIPTION OF EMBODIMENTS

Figure 1:
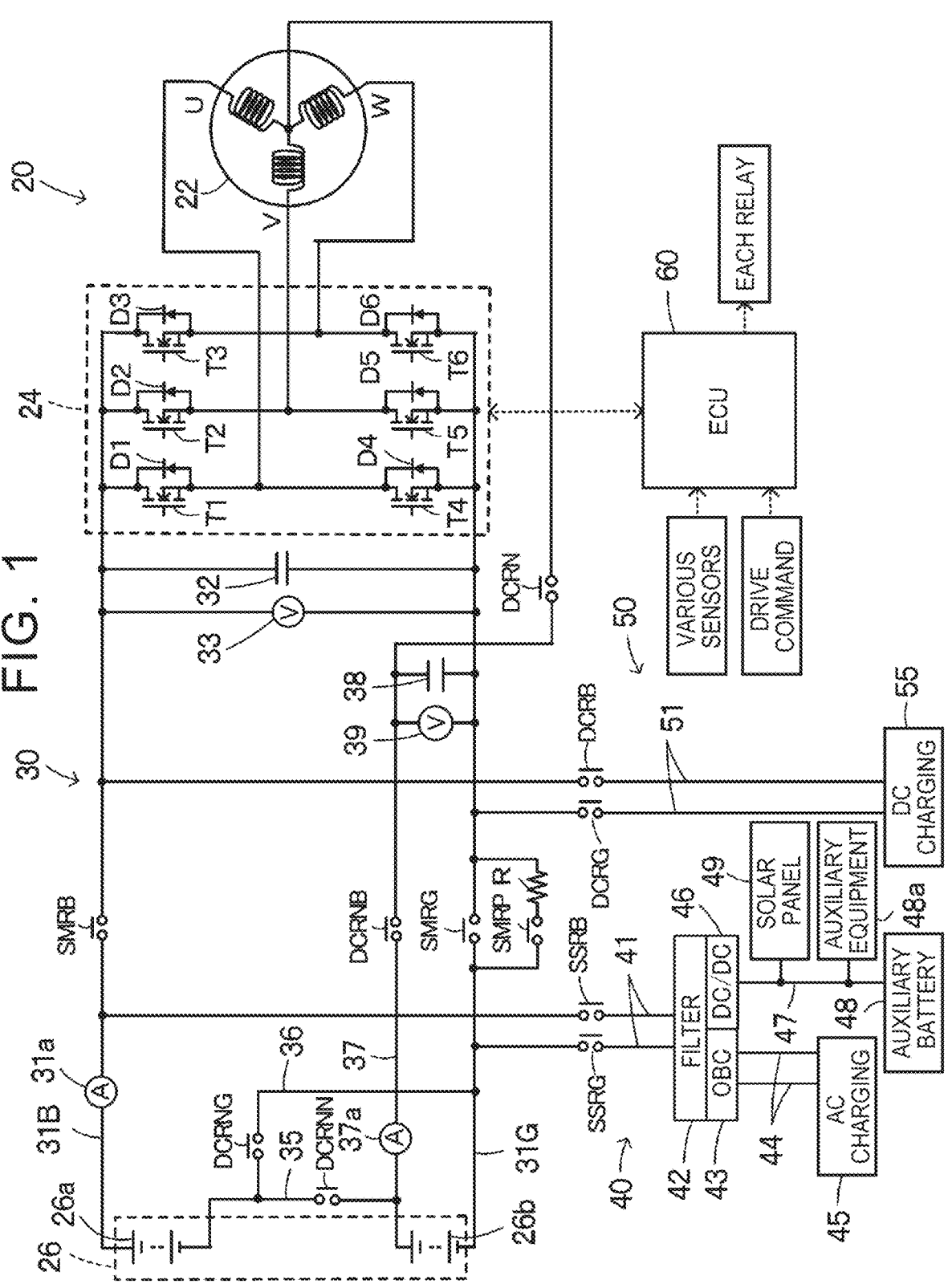
FIG. 1 is a configuration diagram schematically showing a configuration of a power supply system 20 according to an embodiment of the present disclosure.

Next, a mode for carrying out the present disclosure (embodiment) will be described. FIG. 1 is a configuration diagram schematically showing the configuration of an in-vehicle power supply system 20 according to an embodiment of the present disclosure. The power supply system 20 of the embodiment is mounted on an electrified vehicle as a device for transferring electric power between the battery 26 and the inverter 24 that drives the motor 22. The power supply system 20 of the embodiment charges and discharges the battery 26 by using the motor 22 and the inverter 24 as needed. The power supply system 20 includes a battery 26, a motor 22, an inverter 24, a main power supply circuit 30, an alternating current charging circuit 40, a direct current charging circuit 50, and an electronic control unit 60. The motor 22 functions as an electric motor for traveling electrified vehicle.

The motor 22 is configured as a well-known three-phase alternating current motor including, for example, a rotor having a permanent magnet attached to an outer surface thereof and a stator in which three-phase coils are wound. The inverter 24 includes six transistors T1 to T6 as switching elements, and six diodes D1 to D6 connected in parallel on the opposite side form the transistors T1 to T6. The transistors T1 to T6 are provided in pairs such that the inverter 24 serves as a source and a sink with respect to the cathode bus 31B and the anode bus 31G of the battery 26. Each of the three-phase (U-phase, V-phase, and W-phase) coils of the motor 22 is connected to the connecting point of a corresponding one of the pairs of transistors T1 to T6. The inverter 24 forms a rotating magnetic field in the three-phase coils by controlling the ratio of the on-time of the pairs of transistors T1 to T6 while a voltage is applied between the cathode bus 31B and the anode bus 31G, and thus drives the motor 22 to rotate. A first capacitor 32 for smoothing is provided between the cathode bus 31B and the anode bus 31G.

The battery 26 includes a first battery 26a and a second battery 26b configured similarly to the first battery 26a. The first battery 26a and the second battery 26b are configured as, for example, a lithium-ion secondary battery or a nickel-hydrogen secondary battery. The cathode terminal of the first battery 26a is connected to the cathode bus 31B, and the anode terminal of the second battery 26b is connected to the anode bus 31G. The anode terminal of the first battery 26a is connected to the cathode terminal of the second battery 26b by a series power line 35 on which a relay DCRNN included in the configuration of the main power supply circuit 30 is provided. Therefore, when the relay DCRNN is turned on, the first battery 26a and the second battery 26b function as one battery connected in series.

The main power supply circuit 30 includes a first parallel power line 36 and a second parallel power line 37 in addition to the cathode bus 31B, the anode bus 31G, and the series power line 35. The first parallel power line 36 connects the anode terminal of the first battery 26a and the anode bus 31G. The second parallel power line 37 connects the cathode terminal of the second battery 26b to the neutral point of the motor 22. A cathode relay SMRB is provided on the cathode bus 31B, and an anode relay SMRG is provided on the anode bus 31G. In addition, the anode bus 31G is provided with a pre-charge circuit including a pre-charge relay SMRP and a resistor R in parallel with the anode relay SMRG. The cathode relay SMRB, the anode relay SMRG, and the pre-charge circuit constitute a system main relay. That is, when the first battery 26a and the second battery 26b are connected in series, the cathode relay SMRB is turned on and the pre-charge relay SMRP is turned on to charge the first capacitor 32, and when the charging of the first capacitor 32 is completed, the anode relay SMRG is turned on and the pre-charge relay SMP is turned off, such that the power from the battery 26 including the first battery 26a and the second battery 26b connected in series can be supplied to the inverter 24, or conversely, the battery 26 can be charged with the regenerative power from the motor 22.

A relay DCRNG is provided on the first parallel power line 36. A relay DCRNB is provided on the second battery 26b side and a relay DCRN is provided on the neutral point side of the motor 22 to the second parallel power line 37. A second capacitor 38 is provided between the relay DCRNB and the relay DCRN of the second parallel power line 37 and to the anode bus 31G.

The alternating current charging circuit 40 includes an alternating current charging power line 41 connected to the cathode bus 31B and the anode bus 31G, and an on-board charger (OBC) 43 connected to the alternating current charging power line 41 via the filter 42. The alternating current charging circuit 40 further includes a AC charging connector 45 connected to the on-board charger 43 by a power line 44, a DC/DC converter 46 connected to the alternating current charging power line 41 via a filter 42 in parallel with the on-board charger 43, an auxiliary battery and auxiliary equipment 48a connected to DC/DC converter 46 by a power line 47, and a solar panel 49. A relay SSRB is provided on the cathode line of the alternating current charging power line 41, and a relay SSRG is provided on the anode line.

The direct current charging circuit 50 includes a direct current charging power line 51 connected to the cathode bus 31B and the anode bus 31G, and a DC charging connector 55 connected to the direct current charging power line 51. A relay DCRB is provided on the cathode line of the direct current charging power line 51, and a relay DCRG is provided on the anode line.

The electronic control unit 60 is configured as a micro-computer centered on a CPU, not shown. Signals from various sensors are input to the electronic control unit 60. Examples of the various sensors include a voltage sensor 33, a voltage sensor 39, a current sensor 31a, and a current sensor 37a. Examples of the various sensors include a phase current sensor, not shown, that detects a phase currents Iu, Iv, Iw flowing through the three phases of the motor 22, a voltage sensor, not shown, that detects a voltage Vb1 between terminals of the first battery 26a, and a voltage sensor, not shown, that detects a voltage Vb2 between terminals of the second battery 26b. The voltage sensor 33 detects a voltage VH between terminals of the first capacitor 32. The voltage sensor 39 detects a voltage VD between terminals of the second capacitor 38. The current sensor 31a detects a current Ib1 flowing through the first battery 26a. The current sensor 37a detects a current Id flowing through the second parallel power line 37. Since the electronic control unit 60 also functions as a controller for driving the motor 22, it also inputs a drive command and the like. When the power supply system 20 is mounted on a vehicle and the motor 22 is used as a motor for traveling, an accelerator operation amount and a vehicle speed may be input to the electronic control unit 60, and a torque command for the motor 22 may be generated by the electronic control unit 60.

The electronic control unit 60 outputs a drive control signal to each relay, a switching control signal to the inverter 24, and the like. Examples of the relays include a cathode relay SMRB, an anode relay SMRG, a pre-charge relay SMRP, a relay DCRNN, and a relay DCRNG. Other examples include a relay DCRNB, a relay DCRN, a relay SSRB, a relay SSRB, a relay DCRB, and a relay DCRG.

In the power supply system 20 of the embodiment configured as described above, when the motor 22 is driven and traveling as the traveling motor, the cathode relay SMRB, the anode relay SMRG, the relay SSRB, the relay SSRG, and the relay DCRNN are turned on. The relay DCRB, the relay DCRG, the relay DCRN, the relay DCRB, and the relay DCRG are turned off. Switching of the six transistors T1 to T6 of the inverter 24 is controlled by PWM control etc. based on a torque command corresponding to the accelerator operation amount and the vehicle speed V.

Next, an operation when the battery 26 is charged with the power generated by the solar panel 49 will be described. FIG. 2 is a flowchart illustrating an example of a solar charging process that is performed by the electronic control unit 60 when the battery 26 is to be charged with the power from the solar panel 49. FIG. 3 is a flowchart illustrating an example of charge equalization control performed by the electronic control unit 60. The charge equalization control will be described later.

When the solar charging process is performed, the electronic control unit 60 first determines whether the battery 26 is to be charged with power from the solar panel 49 (S100). When it is determined that the battery 26 is not to be charged with the power from the solar panel 49, for example, an external direct current power supply is connected to the DC charging connector 55 and the battery 26 is charged with power from the external direct current power source. At that time, since this processing is not subject to this processing, this process ends.

Figure 4:
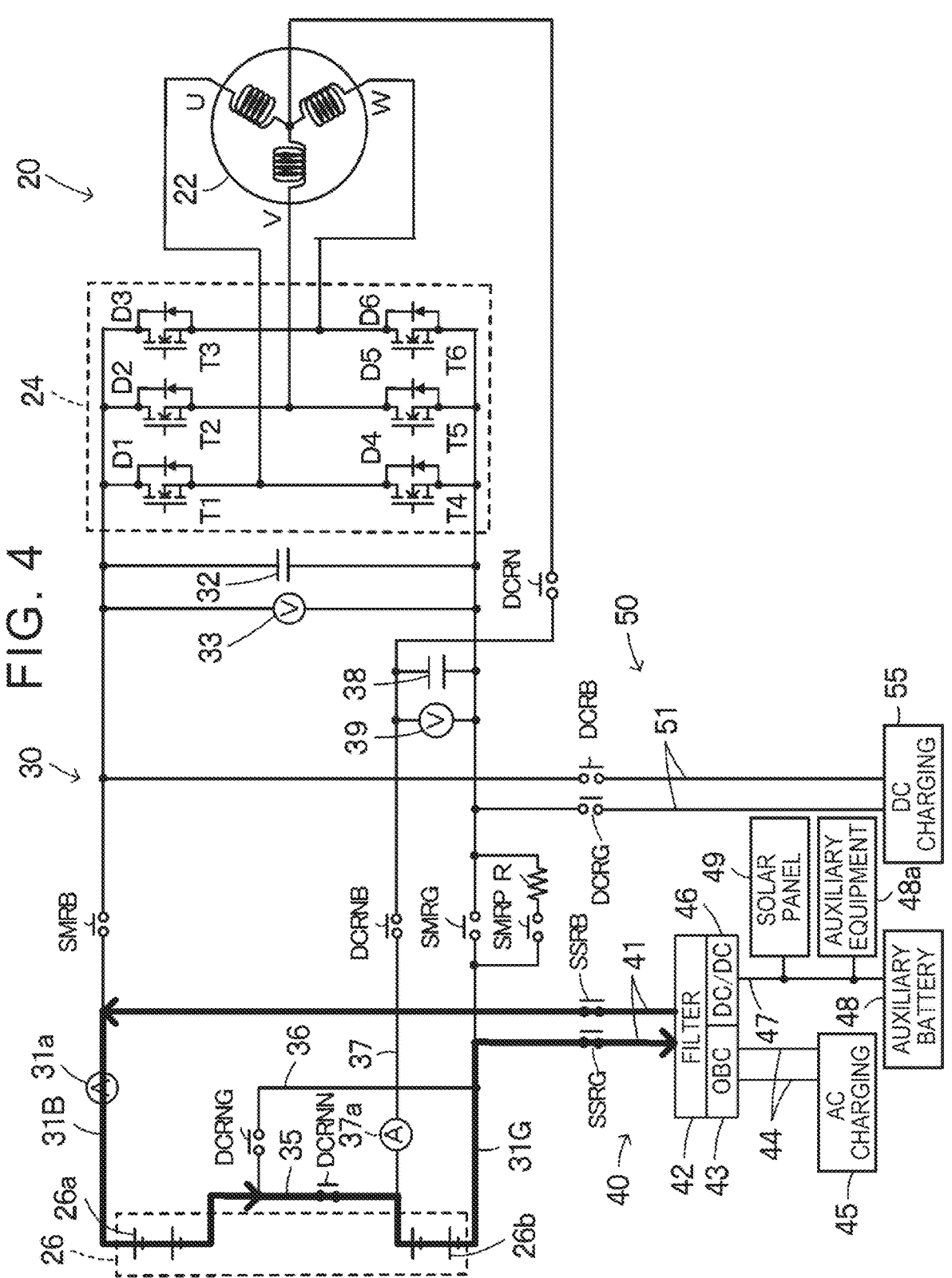
FIG. 4 illustrates an example of a circuit when the first battery 26a and the second battery 26b are connected in series and charged.

In S100, when it is determined that the battery 26 is to be charged with the power from the solar panel 49, it is determined whether the load (power consumption) of the auxiliary equipment 48a is less than predetermined power (S110). The predetermined power may be, for example, power that can be generated by the solar panel 49 on a cloudy day. When it is determined that the load (power consumption) of the auxiliary equipment 48a is equal to or greater than the predetermined power, the first battery 26a and the second battery 26b are charged by the series connection charge control (S140), and this process ends. The first battery 26a and the second battery 26b is charged by the series connection charge control as shown in FIG. 4. That is, the relay SSRB, relay SSRG, and relay DCRNN are turned on, and the relay DCRB, the cathode relay SMRB, the anode relay SMRG, relay DCRB, relay DCRG, relay DCRN, relay DCRNB, relay, and relay DCRG are turned off. A circuit is formed from the filter 42 back to the filter 42 via the relay SSRB, the cathode bus 31B, the first battery 26a, the series power line 35, the relay DCRNN, the second battery 26b, the anode bus 31G, and the relay SSRG. Even when the load (power consumption) of the auxiliary equipment 48a becomes larger than the power generated by the solar panel 49 during charging of the battery 26 with the power from the solar panel 49 because the power generation of the solar panel 49 decreases or the load (power consumption) of the auxiliary equipment 48a increases, the power of the battery 26 can be stepped down in voltage and supplied to the auxiliary equipment 48a without driving the relays by merely changing the switching control of the DC/DC converter 46.

When it is determined in S110 that the load (power consumption) of the auxiliary equipment 48a is less than the predetermined power, a loss L1 when the series connection charge control is performed is calculated. The series connection charge control is control in which the first battery 26a and the second battery 26b are connected in series and charged. At the same time, a loss L2 when charge equalization control is calculated (S120). The charge equalization control is control of charging the first battery 26a and the second battery 26b by alternately repeating a first battery charging process of charging the first battery 26a and an equalization process of equalizing the state of charge SOC1 of the first battery 26a and the state of charge SOC1 of the second battery 26b. The loss L1 is a loss when the battery 236 is charged using a circuit from the filter 42 back to the filter 42 via the relay SSRB, the cathode bus 31B, the first battery 26a, the relay DCRNN, the second battery 26b, the anode bus 31G, the relay SSRG. The charge equalization control and its loss L2 will be described later.

Subsequently, the loss L1 when the series connection charge control is performed is compared with the loss L2 when the charge equalization control is performed (S130), and it is determined that the loss L1 when the series connection charge control is performed is smaller than the loss L2 when the charge equalization control is performed. At that time, the series connection charge control is performed (S140), and this process ends. On the other hand, when it is determined in S130 that the loss L1 when the series connection charge control is performed is equal to or larger than the loss L2 when the charge equalization control is performed, the charge equalization control is performed (S150), and this process ends.

Figure 5:
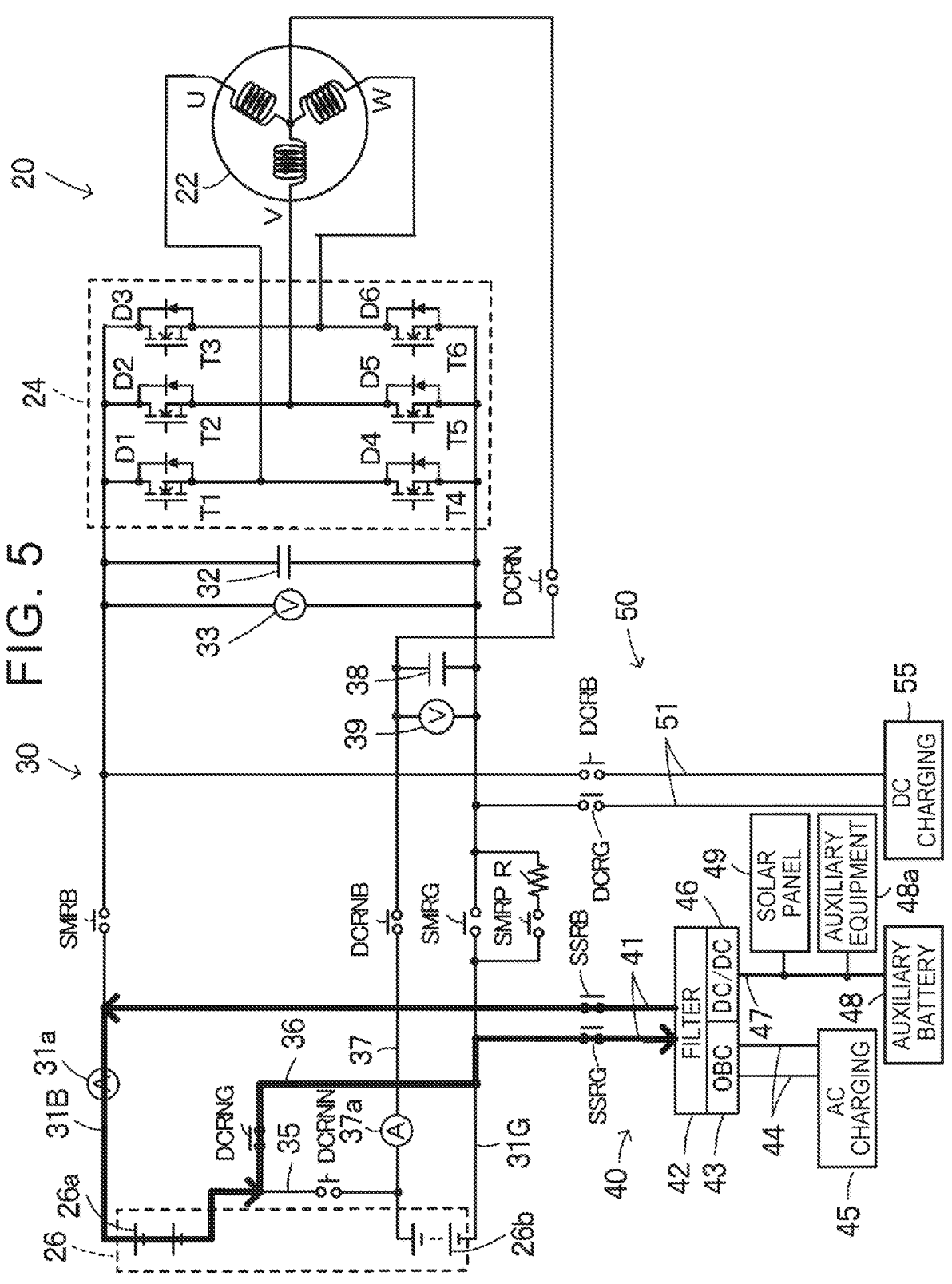
FIG. 5 illustrates an example of a circuit when the first battery 26a is charged.

In the charge equalization control, as shown in the flow-chart of FIG. 3, the electronic control unit 60 first charges the first battery 26a (S200). Charging of the first battery 26a is performed as shown in the illustration of FIG. 5. That is, the relay SSRB, the relay SSRG, and the relay DCRNG are turned on. At the same time, the cathode relay SMRB, the anode relay SMRG, the relay DCRNN, the relay DCRB, the relay DCRG, the relay DCRN, the relay DCRNB, the relay DCRB, and the relay DCRG are turned off. A circuit is formed from the filter 42 back to the filter 42 via the relay SSRB, the cathode bus 31B, the first battery 26a, the relay DCRNG, the first parallel power line 36, the anode bus 31G, and the relay SSRG.

Figure 6:
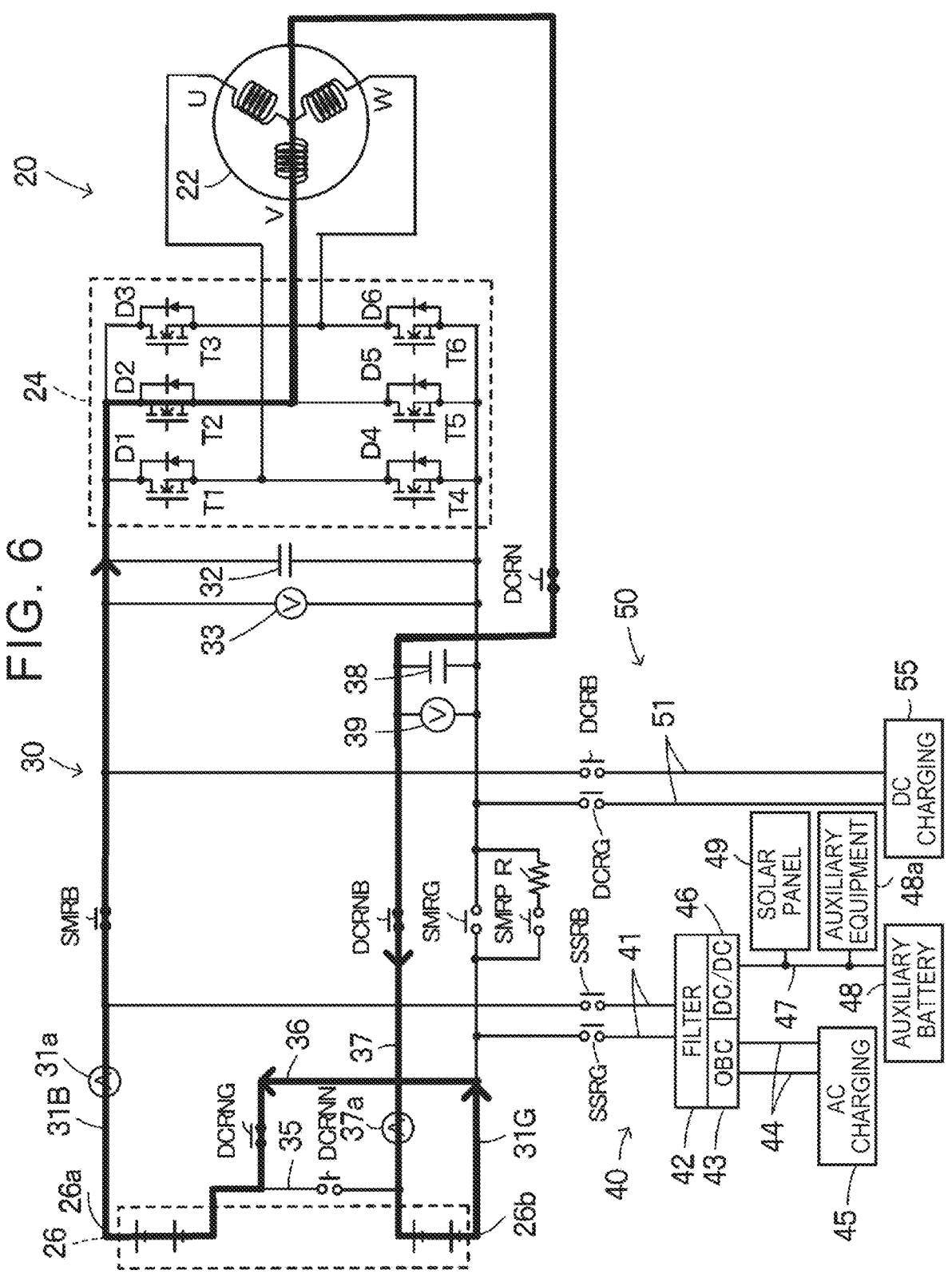
FIG. 6 illustrates an example of a circuit when the equalization process is performed.

Next, it is determined whether the difference (SOC1– SOC2) between the state of charge SOC1 of the first battery 26a and the state of charge SOC1 of the second battery 26b is equal to or larger than the threshold Sref (S210). When it is determined that the difference (SOC1–SOC2) between the state of charge SOC1 of the first battery 26a and the state of charge SOC1 of the second battery 26b is equal to or larger than the threshold Sref, a process of equalizing the state of charge SOC1 of the first battery 26a and the state of charge SOC1 of the second battery 26b is performed (S220). At the same time, the power from the solar panel 49 is supplied to the auxiliary battery 48 and the auxiliary equipment 48a during the equalization process (S230). The equalization process is performed as shown in the illustration of FIG. 6. That is, the cathode relay SMRB, the relay DCRNG, the relay DCRN, and the relay DCRNB are turned on, and the relay SSRB, the relay SSRG, the cathode relay SMRB, the anode relay SMRG, the relay DCRNN, the relay DCRB, and the relay DCRG are turned off. Further, any one or two or all of the transistors T1, T2, T3 of the inverter 24 are turned on, and a circuit is formed from the cathode terminal of the first battery 26a to the anode terminal of the first battery 26a via the cathode bus 31B, cathode relay SMRB, the transistors T1, T2, T3 of the inverter 24, the motor 22, the second parallel power line 37, the relay DCRN, the relay DCRNB, the second battery 26b, the anode bus 31G, the first parallel power line 36, and the relay DCRNG. The power from the solar panel 49 can be supplied to the auxiliary battery 48 and the auxiliary equipment 48a through the power line 47. When it is determined in S210 that the difference (SOC1– SOC2) between the state of charge SOC1 of the first battery 26a and the state of charge SOC1 of the second battery 26b is less than the threshold Sref, the equalization process is not performed.

Subsequently, it is determined whether charging of the battery 26 has ended (S240). The end of charging of the battery 26 includes, for example, when the first battery 26a and the second battery 26b are fully charged, and when the vehicle is prepared to start traveling. When it is determined that charging of the battery 26 has not ended, the process returns to the process of charging the first battery 26a in S200. The process of S200 to S240 is a process of charging the first battery 26a until the difference between the state of charge SOC1 of the first battery 26a and the state of charge SOC2 of the second battery 26b is more than the threshold Sref, and the process of equalizing the state of charge SOC1 of the first battery 26a and the state of charge SOC2 of the second battery 26b and the process of supplying to the auxiliary battery 48 and the auxiliary equipment 48a of power from the solar panel 49 in the process of the equalization process, and the process of repeatedly until it is determined that charging has ended. Note that the loss L2 when the charge equalization control is performed is a loss when the process of charging the first battery 26a and the process of equalizing the state of charge SOC1 of the first battery 26a and the state of charge SOC2 of the second battery 26b are alternately performed.

When it is determined in S230 that charging has ended, the equalization process is performed (S250), and the process ends. The equalization process is performed last in order to make the state of charge SOC1 of the first battery 26*a* and the state of charge SOC2 of the second battery 26*b* the same.

During the charge equalization control, the load (power consumption) of the auxiliary equipment 48*a* may become larger than the power generated by the solar panel 49 because the power generation of the solar panel 49 decreases or the load (power consumption) of the auxiliary equipment 48*a* increases. The first battery 26*a* and the second battery 26*b* may be connected in series in order to step down the voltage of the power from the battery 26 and supply the resultant power to the auxiliary equipment 48*a*. However, this does not frequently occur because the power consumption of the auxiliary equipment 48*a* is basically less than the predetermined power.

In the power supply system 20 of the embodiment described above, when the battery 26 is charged with the power from the solar panel 49, the load (power consumption) of the auxiliary equipment 48*a* may be equal to or greater than predetermined power. In this case, the first battery 26*a* and the second battery 26*b* are charged by the series connection charge control. Thus, even when the load (power consumption) of the auxiliary equipment 48*a* becomes greater than the power generated by the solar panel 49 because the power generation of the solar panel 49 decreases or the load (power consumption) of the auxiliary equipment 48*a* increases, the power from the battery 26 can be stepped down in voltage and supplied to the auxiliary equipment 48*a* without driving the relays by merely changing the switching control of the DC/DC converter 46. As a result, it is possible to reduce frequent switching of the first battery 26*a* and the second battery 26*b* between series connection and non-series connection when the first battery 26*a* and the second battery 26*b* are to be charged.

In the power supply system 20 of the embodiment, when the battery 26 is charged with the power from the solar panel 49, the load (power consumption) of the auxiliary equipment 48*a* may be less than a predetermined power. At this time, when the loss L1 when the series connection charge control is performed is equal to or larger than the loss L2 when the charge equalization control is performed, the charge equalization control is performed to charge the battery 26. Therefore, the charging time can be reduced and the charging efficiency can be improved as compared with a case where the battery 26 is charged by performing alternating charging control of alternately performing charging of the first battery 26*a* and charging of the second battery 26*b*. Moreover, by supplying the power from the solar panel 49 to the auxiliary battery 48 and the auxiliary equipment 48*a* during the equalization process, the power from the solar panel 49 can be more effectively utilized.

In the power supply system 20 of the embodiment, when the battery 26 is charged with the power from the solar panel 49, the load (power consumption) of the auxiliary equipment 48*a* may be less than a predetermined power. At that time, the battery 26 is charged by selecting either the loss L1 when the series connection charge control is performed or the loss L2 when the charge equalization control is performed, whichever is smaller. As a result, the charging efficiency can be further increased.

The correspondence between the main elements of the embodiments and the main elements of the disclosure described in the column of the means for solving the problem will be described. In the embodiment, the first battery 26*a* corresponds to the "first battery," the second battery 26*b* corresponds to the "second battery," and the auxiliary battery 48 corresponds to the "auxiliary battery." In the embodiment, the auxiliary equipment 48*a* corresponds to the "auxiliary equipment," and the solar panel 49 corresponds to the "power generator." In the embodiment, the main power supply circuit 30 corresponds to the "series-parallel switching circuit," and the DC/DC converter 46 corresponds to the "voltage converter." In the embodiment, the electronic control unit 60 corresponds to the "controller", and the power supply system 20 corresponds to the "power supply system".

The correspondence between the main elements of the embodiment and the main elements of the disclosure described in the section of the means for solving the problem is an example for specifically explaining the embodiment of the disclosure described in the section of the means for solving the problem. It is not intended to limit the elements of the disclosure described in the Means for Solving the Problem section. That is, the interpretation of the disclosure described in the section of the means for solving the problem should be performed based on the description in the section, and the embodiments are merely specific examples of the disclosure described in the section of the means for solving the problem.

Although the present disclosure has been described above using the embodiment, the present disclosure is not limited to the embodiment in any way, and may be implemented in various modes without departing from the scope of the present disclosure.

The present disclosure is applicable to the manufacturing industry of power supply systems etc.

What is claimed is:

1. A power supply system configured to be mounted on a vehicle, the power supply system comprising:

a first battery;

a second battery having the same configuration as the first battery;

an auxiliary battery having a voltage lower than a rated voltage of the first battery;

auxiliary equipment connected to a low-voltage power line connected to the auxiliary battery;

an in-vehicle power generator connected to the low-voltage power line;

a series-parallel switching circuit including a plurality of relays, the series-parallel switching circuit being configured to switch connection of the first battery and the second battery between series connection and parallel connection by turning on and off the relays;

a power converter connected to the series-parallel switching circuit and the low-voltage power line; and a controller configured to drive and control the relays of the series-parallel switching circuit and to control the power converter, wherein the controller is configured to, when the first battery and the second battery are to be charged with power from the power generator, perform series connection charge control when power consumption of the auxiliary equipment is equal to or greater than predetermined power, the series connection charge control being control in which the controller controls the relays and the power converter such that the first battery and the second battery are connected in series and are charged with the power from the power generator, and perform non-series connection charge control when the power consumption of the auxiliary equipment is less than the predetermined power, the non-series connection charge control being control in which the controller controls the relays and the power converter such that the first battery and the second battery are not connected in series and are charged with the power from the power generator.

2. The power supply system according to claim 1, wherein the controller is configured to perform, as the non-series connection charge control, control of alternately performing a first battery charging process and a state-of-charge equalization process, the first battery charging process being a process of charging the first battery by turning on and off the relays such that the first battery is charged with the power from the power generator, and the state-of-charge equalization process being a process of equalizing a state of charge of the first battery and a state of charge of the second battery by charging the second battery with power from the first battery by turning on and off the relays such that the second battery is charged with the power from the first battery.

3. The power supply system according to claim 2, wherein the controller is configured to supply the power from the power generator to the auxiliary equipment or the auxiliary battery during the state-of-charge equalization process.

4. The power supply system according to claim 1, wherein:

the series-parallel switching circuit further includes a series connection line configured to connect an anode terminal of the first battery and a cathode terminal of the second battery;

a series connection relay provided on the series connection line;

a cathode bus connected to a cathode terminal of the first battery;

an anode bus connected to an anode terminal of the second battery;

an inverter connected to the cathode bus and the anode bus;

a three-phase alternating current motor configured to be driven by the inverter;

a cathode relay provided on the cathode bus;

an anode relay provided on the anode bus;

a first parallel connection line configured to connect the series connection line at a position closer to the first battery than the series connection relay and the anode bus;

a first parallel connection relay provided on the first parallel connection line;

a second parallel connection line configured to connect the cathode terminal of the second battery and a neutral point of the three-phase alternating current motor; and a second parallel connection relay and a third parallel connection relay that are provided on the second parallel connection line in order of the second parallel connection relay and the third parallel connection relay from the second battery; and the power converter is connected via a charging relay to the cathode bus at a position closer to the first battery than the cathode relay and to the anode bus at a position closer to the second battery than the anode relay.

* * * * *